US012633207B2

(12) United States Patent
Ganesan et al.

(10) Patent No.:  US 12,633,207 B2
(45) Date of Patent:  May 19, 2026

(54) SYSTEM AND METHOD FOR DYNAMIC RESPONSE TO PANIC ALARM BASED ON SITUATIONAL AWARENESS

(71) Applicant: Honeywell International Inc., Charlotte, NC (US)

(72) Inventors: Balamurugan Ganesan, Bengaluru (IN); Surekha Deshpande, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 108 days.

(21) Appl. No.: 18/514,768

(22) Filed: Nov. 20, 2023

(65) Prior Publication Data

US 2025/0166488 A1      May 22, 2025

(51) Int. Cl.
| | |
|---|---|
| *G08B 25/12* | (2006.01) |
| *G06V 10/764* | (2022.01) |
| *G06V 20/40* | (2022.01) |
| *G06V 20/52* | (2022.01) |
| *G06V 40/20* | (2022.01) |
| *G08B 21/02* | (2006.01) |

(52) U.S. Cl.
CPC ........... *G08B 25/12* (2013.01); *G06V 10/764* (2022.01); *G06V 20/41* (2022.01); *G06V 20/44* (2022.01); *G06V 20/52* (2022.01); *G06V 40/20* (2022.01); *G08B 21/02* (2013.01)

(58) Field of Classification Search
CPC ........ G08B 25/12; G08B 21/02; G06V 20/52; G06V 20/41; G06V 40/20; G06V 10/764; G06V 20/44

USPC ...................................................... 340/573.1
See application file for complete search history.

(56) References Cited

U.S. PATENT DOCUMENTS

| | | | |
|---|---|---|---|
| 4,446,458 A | 5/1984 | Cook | |
| 8,302,856 B1 * | 11/2012 | Grimm | .................. G06Q 40/02 |
| | | | 235/379 |
| 11,212,353 B2 * | 12/2021 | Dai | .......................... H04L 67/55 |
| 11,282,353 B1 * | 3/2022 | Fowler | ............. G08B 13/19613 |
| 11,688,220 B2 | 6/2023 | Khadloya et al. | |

(Continued)

FOREIGN PATENT DOCUMENTS

IN      202041031343 A      7/2020

OTHER PUBLICATIONS

Extended European Search Report, EP Application No. 24209994.3, European Patent Office, Apr. 8, 2024 (6 pages).

*Primary Examiner* — Naomi J Small
(74) *Attorney, Agent, or Firm* — Seager, Tufte & Wickhem, LLP

(57) ABSTRACT

A video stream captures at least part of the region of the facility and video analytics is performed to identify one or more video identified events. One or more sensor identified events are received and a current status of the region of the facility is classified into one of a plurality of predetermined status categories based at least in part on the one or more video identified events and the one or more sensor identified events. Activation of a panic button causes a panic alarm to be issued, wherein the panic alarm is issued as a silent panic alarm when the current status of the region is classified in a first predetermined status category and is issued as an audible panic alarm when the current status of the region is classified in a second predetermined status category.

16 Claims, 3 Drawing Sheets

(56) References Cited

U.S. PATENT DOCUMENTS

| | | | |
|---|---|---|---|
| 2004/0168194 A1* | 8/2004 | Hughes | H04N 21/814 |
| | | | 725/105 |
| 2008/0117029 A1 | 5/2008 | Dohrmann et al. | |
| 2016/0321892 A1 | 11/2016 | Divakara et al. | |
| 2018/0122220 A1* | 5/2018 | Billig | G08B 25/10 |
| 2019/0164406 A1* | 5/2019 | Werner | H04L 12/1895 |
| 2020/0327315 A1* | 10/2020 | Mullins | G06V 40/103 |
| 2021/0279603 A1 | 9/2021 | Teran Matus et al. | |
| 2021/0280048 A1 | 9/2021 | McNutt et al. | |
| 2021/0309183 A1* | 10/2021 | Bielby | B60R 25/31 |
| 2021/0383193 A1 | 12/2021 | Navoni | |
| 2022/0028241 A1* | 1/2022 | Gans | H04L 41/022 |
| 2022/0072350 A1* | 3/2022 | Bausch | A62C 3/0271 |
| 2022/0114871 A1 | 4/2022 | Lau et al. | |
| 2022/0148397 A1* | 5/2022 | Schoeman | H04L 12/2823 |
| 2022/0262121 A1* | 8/2022 | Iqbal | G06V 40/20 |
| 2023/0260536 A1* | 8/2023 | Xu | G06F 40/30 |
| | | | 704/231 |
| 2023/0290184 A1* | 9/2023 | Filipowicz | G06F 18/24133 |

* cited by examiner

SYSTEM AND METHOD FOR DYNAMIC RESPONSE TO PANIC ALARM BASED ON SITUATIONAL AWARENESS

TECHNICAL FIELD

The present disclosure relates generally to security systems and more particularly to security systems having panic alarms.

BACKGROUND

Commercial security systems include intrusion-related detection and life safety-related detection such as fire and carbon monoxide. Commercial security systems may include emergency panic alarms that an individual may trigger in the event of an emergency. A commercial security system may raise an audible alarm, in which a signal is sent to the authorities and a local siren sounds. A commercial security system may raise a silent alarm, in which a signal is sent to the authorities, but no local siren sounds.

In some instances, depending on the situation, it may be best for the commercial security system to raise an audible alarm. A medical emergency is an example of a situation in which an audible alarm may be best. In some instances, depending on the situation, it may be best for the commercial security system to raise a silent alarm. A person being threatened with a gun is an example of a situation in which a silent alarm may be best. Commercial security systems can be pre-configured to respond in a particular way, but this pre-configuration is static and does not change dynamically depending on the current situation. What would be desirable are methods and systems that allow the commercial security system to determine the current situation in which a panic alarm has been raised, and to respond appropriately.

SUMMARY

The present disclosure relates generally to security systems and more particularly to security systems having panic alarms. An example may be found in a method for responding to an activation of a panic button in a region of a facility. The illustrative method includes receiving a video stream capturing at least part of the region of the facility and performing video analytics on the video stream to identify one or more video identified events associated with the region of the facility. One or more sensor identified events sensed by one or more sensors associated with the region of the facility are also received. A current status of the region of the facility is classified into one of a plurality of predetermined status categories based at least in part on the one or more video identified events and the one or more sensor identified events. A notification of an activation of a panic button by a user in the region of the facility is received. In response to receiving the notification of the activation of the panic button, a panic alarm associated with the region of the facility is issued, wherein the panic alarm is issued as a silent panic alarm when the current status of the region is classified in a first one of the plurality of predetermined status categories (e.g. person is under duress) and is issued as an audible panic alarm when the current status of the region is classified in a second one of the plurality of predetermined status categories (e.g. person is suffering a medical condition such as a fall).

Another example may be found in a system. The illustrative system includes a panic button associated with a region of the facility, a video camera for capturing a video stream of at least part of the region of a facility, one or more sensors associated with the region of the facility for sensing one or more sensor identified events associated with the region of the facility, an output for issuing alarms, and a controller operatively coupled to the panic button, the video camera, the one or more sensors, and the output. The controller is configured to perform video analytics on the video stream to identify one or more video identified events associated with the region of the facility and to classify a current status of the region of the facility into one of a plurality of predetermined status categories based at least in part on the one or more video identified events and the one or more sensor identified events. The controller is configured to receive a notification of an activation of the panic button and in response to receiving the notification of the activation of the panic button, issue a panic alarm associated with the region of the facility via the output, wherein the panic alarm is issued as a silent panic alarm when the current status of the region is classified in a first one of the plurality of predetermined status categories and is issued as an audible panic alarm when the current status of the region is classified in a second one of the plurality of predetermined status categories.

Another example may be found in a non-transitory computer readable medium storing instructions. When the instructions are executed by one or more processors, the one or more processors are caused to receive a video stream capturing at least part of a region of a facility and to perform video analytics on the video stream to identify one or more video identified events associated with the region of the facility. The one or more processors are caused to receive one or more sensor identified events sensed by one or more sensors associated with the region of the facility and to classify a current status of the region of the facility into one of a plurality of predetermined status categories based at least in part on the one or more video identified events and the one or more sensor identified events. The one or more processors are caused to receive a notification of an activation of a panic button, and in response to receiving the notification of the activation of the panic button, issue a panic alarm associated with the region of the facility, wherein the panic alarm is issued as a silent panic alarm when the current status of the region is classified in a first one of the plurality of predetermined status categories and is issued as an audible panic alarm when the current status of the region is classified in a second one of the plurality of predetermined status categories.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
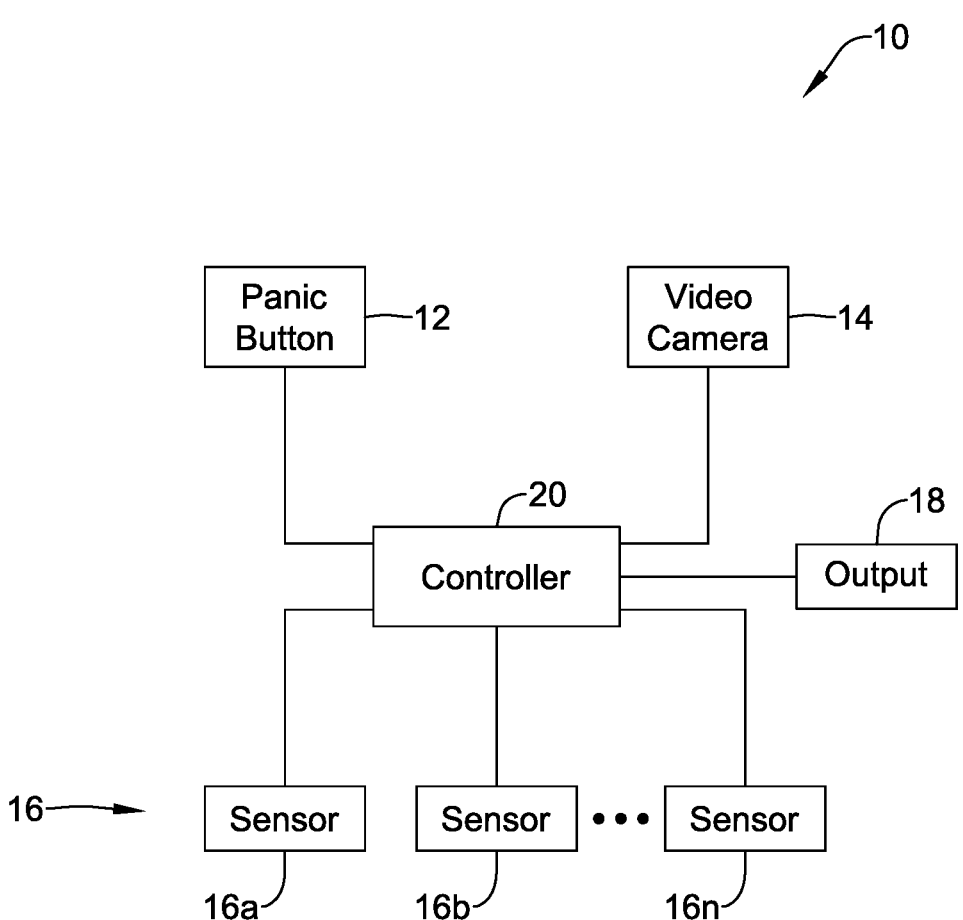
FIG. 1 is a schematic block diagram showing an illustrative security system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram showing an illustrative security system 10. The illustrative security system 10 includes a panic button 12 that is associated with a region of the facility. The panic button 12 may be configured to allow a user to push or otherwise activate the panic button 12 when the user sees, hears or otherwise detects or suspects a potential problem. This may include a suspected fire, or visible smoke, for example. This may include a fight breaking out. This may include a medical emergency. The panic button 12 may be a wired panic button or wireless panic button. The illustrative security system 10 includes a video camera 14 for capturing a video stream of at least part of the region of a facility, such as including a part of the facility corresponding to where the panic button 12 is located. In some cases, the illustrative security system 10 includes a plurality of video cameras for capturing a plurality of video streams of at least part of the region of the facility. The illustrative security system 10 includes a number of sensors 16, individually labeled as 16a, 16b and through 16n. The illustrative security system 10 may include any number of sensors 16, including intrusion sensors such as motion sensors, glass break sensors, security panel keypads and tamper sensors. The sensors 16 may include one or more access control sensors such as a card reader or a biometric reader. The sensors 16 may include one or more gas sensors, one or more temperature sensors, one or more humidity sensors and/or one or more fire sensors. These are just examples. The illustrative security system 10 includes an output 18 for issuing alarms. The output 18 may include an audible device such as a siren or a loudspeaker. The output 18 may include a communication channel that allows an alert or alarm to be sent to the authorities, for example, or to security personnel.

The illustrative security system 10 includes a controller 20 that is operatively coupled to the panic button 12, the (one or more) video camera 14, the one or more sensors 16 and the output 18. The controller 20 is configured to perform video analytics on the video stream from the (one or more) video camera 14 to identify one or more video identified events associated with the region of the facility. The controller 20 is configured to classify a current status of the region of the facility into one of a plurality of predetermined status categories based at least in part on the one or more video identified events and the one or more sensor identified events. The controller 20 is configured to receive a notification of an activation of the panic button, and in response, issue a panic alarm associated with the region of the facility via the output, wherein the panic alarm is issued as a silent panic alarm when the current status of the region is classified in a first one of the plurality of predetermined status categories and is issued as an audible panic alarm when the current status of the region is classified in a second one of the plurality of predetermined status categories. In some instances, the controller 20 may be configured to use a fusion of video analytics (e.g. video identified events), intrusion sensor data (e.g. intrusion sensor identified events) and access control sensor data (e.g. access control sensor events) in classifying the current status of the region as the first one of the plurality of predetermined status categories or as the second one of the plurality of predetermined status categories.

In some instances, the controller 20 may be a distributed controller, meaning that part of the controller 20 may be co-located with the video camera 14. In some instances, the part of the controller 20 that is co-located with the video camera 14 may be configured to perform at least some of the video analytics that are performed on the video stream of the video camera 14 in order to identify one or more video identified events associated with the region of the facility. In some instances, part of the controller 20 may be implemented on a server in a cloud environment. In some instances, the controller 20 may implement an Artificial Intelligence and/or Machine Learning (AI/ML) engine that is trained to identify one or more video identified events associated with the region of the facility. In some instances, the controller 20 may include an Artificial Intelligence and/or Machine Learning (AI/ML) engine that is trained to identify and classify the current status of the region of the facility into one of the plurality of predetermined status categories based at least in part on the one or more of the video identified events and the one or more sensor identified events.

Figure 2:
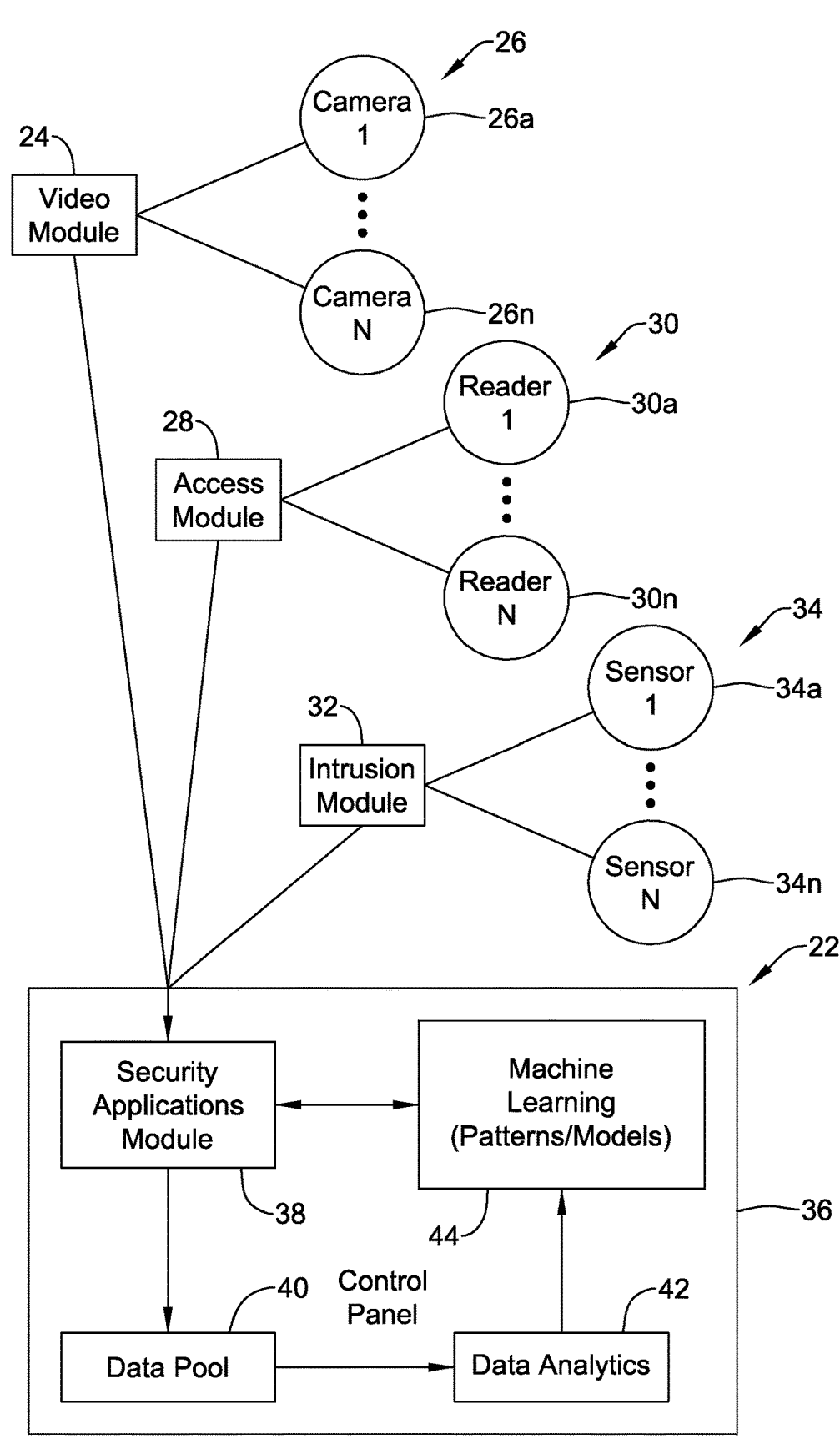
FIG. 2 is a schematic block diagram showing an illustrative security system.

FIG. 2 is a schematic block diagram showing an illustrative security system 22 that may be considered as being an example of the security system 10 (FIG. 1). A video module 24 receives video streams from a number of cameras 26, individually labeled as 26a through 26n. An access module 28 communicates with a number of readers 30, individually labeled as 30a through 30n. The access module 28 may communicate with the readers 30 to indicate whether a particular user presenting their credentials (such as an access card or biometric fingerprint) is authorized to proceed or not, for example. An intrusion module 32 communicates with a number of sensors 34, individually labeled as 34 through 34*n*. The sensors 34 may include any of intrusion sensors such as motion sensors, glass break sensors, security panel keypads and tamper sensors. In some cases, the sensors 34 may include one or more access control sensors such as a card reader or a biometric reader. The sensors 34 may include one or more gas sensors, one or more temperature sensors, one or more humidity sensors and/or one or more fire sensors. These are just examples.

The video module 24, the access module 28 and the intrusion module 32 may each communicate with a control panel 36. In some instances, the control panel 36 may be considered as being an example of the controller 20 shown in FIG. 1. The control panel 36 implements a control logic that includes a security applications module 38, a data pool 40, a data analytics block 42 and a machine learning block 44. The events and/or alarms detected by the video module 24, the access module 28 and the intrusion module 32 are fed to the security applications module 38, which then sends the events and alarms to the data pool 40. The data pool 40 filters the events and/or alarms and sends filtered events and/or alarms to the data analytics block 42. The data pool 40 may, for example, filter the events and/or alarms by remove outliers, duplicates and/or one or more event or alarm types that are not of interest. In the example shown, the data analytics block 42 analyzes the filtered events and/or alarms and provides fused events and/or alarms to the machine learning block 44. The events and/or alarms may be correlated with one another. For example, the detection of a person in a region by a motion sensor and the detection of the person in the region by a video analytics algorithm may associate or fuse these events. When a video analytics algorithm includes a facial recognition algorithm, a uniquely identified person may be identified and that person may be associated or fused with a motion detection event detected by the motion sensor. In another example, the access module 28 may report entry of uniquely identified individuals into a region (e.g. via a card swipe or biometric swipe), and these uniquely identified individuals may be associated or fused with the people detected in the region by a video analytics algorithm. These are just examples. The machine learning block 44 may include an Artificial Intelligence and/or Machine Learning (AI/ML) engine that is trained to identify and classify a current status of a region of the facility into one of the plurality of predetermined status categories based at least in part on the one or more of the video identified events and the one or more sensor identified events. In the example shown, actions pass back and forth between the security applications module 38 and the machine learning block 44. For example, the security applications module 38 may issue alerts depending on the current status of a region as determined by the machine learning block 44.

In some instances, the control panel 36 may receive multiple events or alerts, including some events that may warrant an audible alarm and some events that may warrant a silent alarm, and may need to weight various conflicting events to determine whether to issue an audible alarm or a silent alarm. In some instances, the alarms may fall into one of three different categories. A "normal status" means that while one or more cameras 26, one or more readers 30 or one or more sensors 34 may be indicating an alarm situation, no one has activated a panic alarm. Under normal status, the control panel 36 may rely upon its initial pre-configuration as to whether to raise an audible alarm or a silent alarm for a given alarm condition. Some alarms may fall into an intrusion emergency category, which may be pre-configured to issue a silent alarm. Some alarms may fall into a fire or medical or fire emergency category, which may be pre-configured to issue an audible alarm. The following table provides some examples of possible alarms and alarm categories:

TABLE I

| Area Status | Video Events | Access Events | Intrusion/Fire Events |
|---|---|---|---|
| Intrusion Emergency (Automatic Silent Alarm) | | | |
| | 1. Trip wire detected (high) | 1. Duress (forced disarm) event (high) | 1. Number of zone bypass events (medium) |
| | 2. Weapon/gun identified (high) | 2. Multiple access failure events (medium) | 2. Number of zone override vents (low) |
| | 3. Person hands up (low) | 3. Tailgating (medium) | 3. Number of sensor or modules missing (high) |
| | 4. Behavioral based intrusion detection (medium) | 4. Door force open (high) | 4. Wireless sensors jammed (high) |
| | 5. Excess people count (low) | | 5. Number of devices tampered with (high) |
| Fire/Medical Emergency (Automatic Audible Alarm) | | | |
| | 1. Human fall down (medium) | | 1. Personal assistance alarm (high) |
| | 2. Human activity detection (low) | | 2. Fire alarm in associated areas (high) |
| | 3. Flame detection (high) | | 3. CO alarm in associated areas (high) |
| | 4. Smoke detection (high) | | |
| | 5. People crowding analysis (low) | | |

In some cases, the initial pre-configuration setting of whether to raise an audible alarm or a silent alarm in response to a panic button press for a given alarm condition can be over-ridden based on a situational context in the corresponding region. For example, in some cases, multiple events and/or alarms may be raised during a common time frame. As an example, say that there is a tailgating access event that is detected as well as a flame detection alert. The tailgating access event may have a medium weight (and silent alarm) and the flame detection alert may have a high weight (and audible alarm). In this situation, the system may generate an audible alarm in response to a panic button press because the flame detection alert outweighs the tailgating access event. In some instances, there may be conflicting alerts. As an example, say that there is a weapon/gun identified alarm (high weight and silent alarm) and a flame detection alert (high weight and audible alarm). In this example, the system may determine that the flame detection alert outweighs the identified gun alert because a fire may have the potential to cause greater damage and loss of life. These are just examples.

In some cases, the situational context (e.g. normal, bur-glary emergency, medical emergency) in a corresponding region may be identified by, for example, doing a pattern analysis on one or more video identified events associated with the region and/or one or more sensor identified events (e.g. intrusion, tamper, fire, smoke, entry of duress code when disarming the security system, entry of zone bypass when arming the security system, etc.) associated with the region. The pattern analysis can reveal insights and predict the situational context in the region, and can apply an audible or silent alarm in response to a panic button press based on the situational context.

Figure 3:
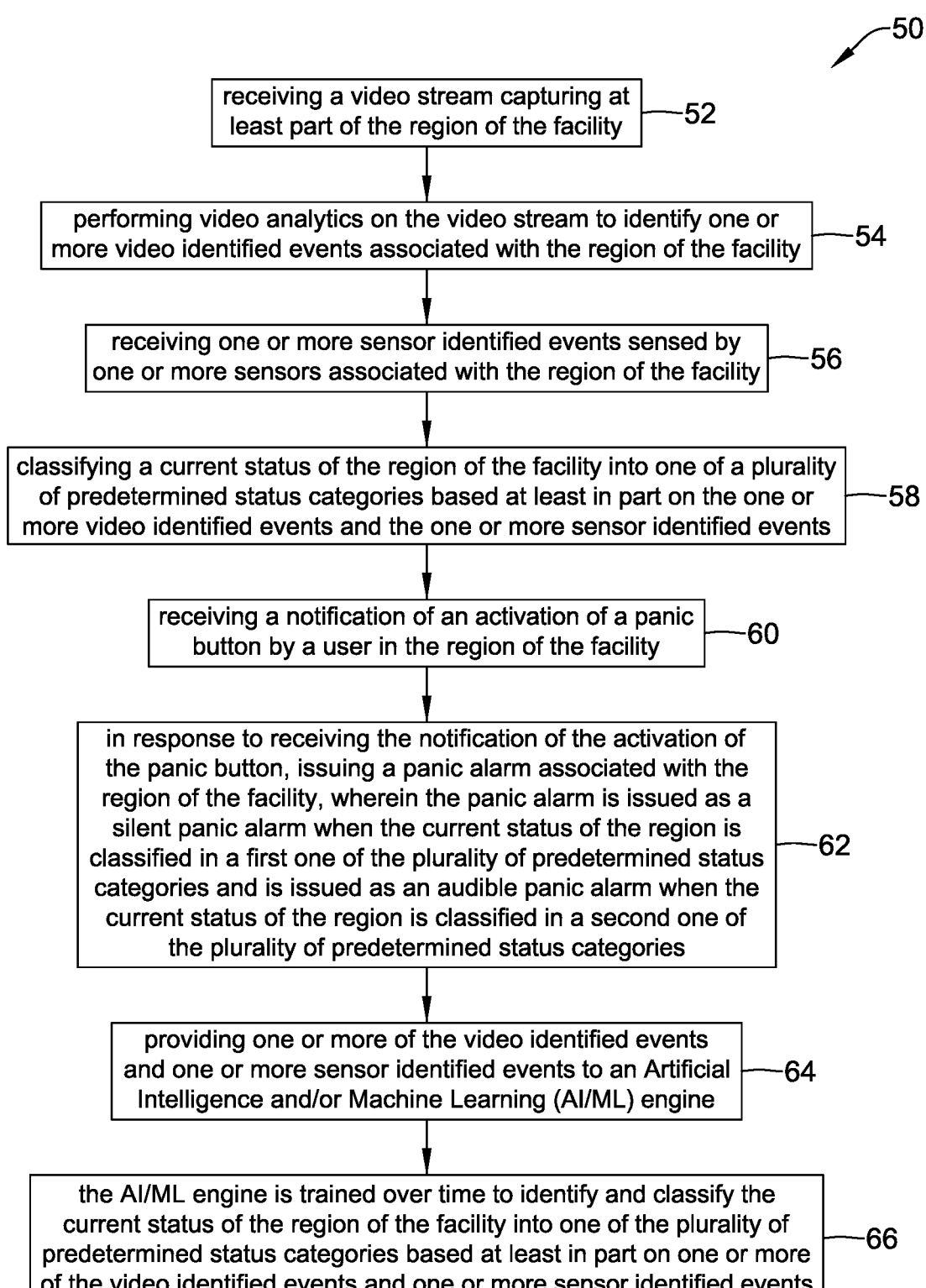
FIG. 3 is a flow diagram is a flow diagram showing an illustrative method for responding to activation of a panic button.

FIG. 3 is a flow diagram showing an illustrative method 50 for responding to an activation of a panic button (such as the panic button 12) in a region of a facility. The illustrative method includes receiving a video stream capturing at least part of the region of the facility, as indicated at block 52. Video analytics are performed on the video stream to iden-tify one or more video identified events associated with the region of the facility, as indicated at block 54. In some instances, the one or more video identified events may include one or more of an identified behavior of one or more people and a presence of an identified object. One or more sensor identified events sensed by one or more sensors associated with the region of the facility are received, as indicated at block 56. In some instances, the one or more sensors associated with the region of the facility may include one or more intrusion sensors. Examples of intrusion sensors include motion sensors, glass break sensors, security panel keypads and tamper sensors. The one or more sensors associated with the region of the facility may include one or more access control sensors, one or more gas sensors, one or more temperature sensors, one or more humidify sensors and one or more fire sensors. Access control sensors may include card readers and biometric readers, for example. At least some of the one or more sensor identified events may include one or more alarms.

A current status of the region of the facility is classified into one of a plurality of predetermined status categories based at least in part on the one or more video identified events and the one or more sensor identified events, as indicated at block 58. A first one of the plurality of prede-termined status categories may correspond to an intrusion emergency category and a second one of the plurality of predetermined status categories may correspond to a medi-cal and/or fire emergency category. A notification of an activation of a panic button by a user in the region of the facility is received, as indicated at block 60. In response to receiving the notification of the activation of the panic button, a panic alarm associated with the region of the facility is issued, wherein the panic alarm is issued as a silent panic alarm when the current status of the region is classified in a first one of the plurality of predetermined status cat-egories and is issued as an audible panic alarm when the current status of the region is classified in a second one of the plurality of predetermined status categories, as indicated at block 62. In some instances, the silent panic alarm may not activate any siren associated with the region of the facility and the audible panic alarm may activate one or more sirens associated with the region of the facility.

In some instances, the method 50 may further include providing one or more of the video identified events and one or more sensor identified events to an Artificial Intelligence and/or Machine Learning (AI/ML) engine, as indicated at block 64. In some instances, the AI/ML engine may be trained over time to identify and classify the current status of the region of the facility into one of the plurality of predetermined status categories based at least in part on one or more of the video identified events and one or more sensor identified events, as indicated at block 66.

In some instances, the AI/ML engine may be trained over time to identify and classify the current status of the region of the facility into one of the plurality of predetermined status categories based at least in part on the particular combination of the currently active events and/or alarms of the security system, such as the events and/or alarms shown in Table I. In some cases, the AI/ML engine may be trained by providing a plurality of different combinations of events and/or alarms of the security system during a training phase, and correcting the AI/ML engine until the current status of the region of the facility is properly classified by the AI/ML engine with a desired degree of accuracy. It is contemplated that the AI/ML engine may not only take into account the currently active events and/or alarms of the security system, but may also be trained using historical events and/or alarms of the security system to help provide a more robust and accurate classification. In some cases, the AI/ML engine is continually trained by having an operator of the security system verify the classification of the AI/ML engine and correct the AI/ML engine as necessary. The corrections are used as input to re-train the AI/ML engine. In some cases, the AI/ML engine may include a Support Vector Machine (SVM) Learning algorithm, which may be particularly good at classifying the current status of the region of the facility into one of the plurality of predetermined status categories. However, any other suitable learning algorithm may be used.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:
1. A method for responding to an activation of a panic button in a region of a facility, the method comprising:
receiving a video stream capturing at least part of the region of the facility;

performing video analytics on the video stream to identify one or more video identified events associated with the region of the facility;

receiving one or more sensor identified events sensed by one or more sensors associated with the region of the facility;

providing one or more of the video identified events and one or more sensor identified events to an Artificial Intelligence and/or Machine Learning (AI/ML) engine, wherein the AI/ML engine is trained over time to identify and classify the current status of the region of the facility into one of the plurality of predetermined status categories based at least in part on one or more of the video identified events and one or more sensor identified events, the plurality of predetermined status categories including a first plurality of categories that trigger a silent panic alarm when detected and a second plurality of categories that trigger an audible panic alarm when detected;

using the AI/ML engine to classify a current status of the region of the facility into one of a plurality of predetermined status categories based at least in part on the one or more video identified events and the one or more sensor identified events;

receiving a notification of an activation of a panic button by a user in the region of the facility; and in response to receiving the notification of the activation of the panic button, issuing a panic alarm associated with the region of the facility, wherein the panic alarm is issued as a silent panic alarm when the current status of the region is classified in a first one of the plurality of predetermined status categories and is issued as an audible panic alarm when the current status of the region is classified in a second one of the plurality of predetermined status categories.

2. The method of claim 1, wherein the silent panic alarm does not activate any siren associated with the region of the facility and the audible panic alarm does activate one or more sirens associated with the region of the facility.

3. The method of claim 1, wherein the AI/ML engine includes a Support Vector Machine (SVM) Learning algorithm.

4. The method of claim 1, wherein the one or more sensors associated with the region of the facility comprise one or more intrusion sensors.

5. The method of claim 4, wherein the one or more intrusion sensors comprise one or more of a motion sensor, a glass break sensor, a security panel keypad and a tamper sensor.

6. The method of claim 1, wherein the one or more sensors associated with the region of the facility comprise one or more access control sensors, one or more gas sensors, one or more temperature sensors, one or more humidify sensors and one or more fire sensors.

7. The method of claim 6, wherein the one or more sensors associated with the region of the facility comprise one or more access control sensors, and wherein the one or more access control sensors include one or more of a card reader and a biometric reader.

8. The method of claim 1, wherein the one or more video identified events comprise one or more of an identified behavior of one or more people and a presence of an identified object.

9. The method of claim 1, wherein the first one of the plurality of predetermined status categories corresponds to an intrusion emergency category and the second one of the plurality of predetermined status categories corresponds to a medical and/or fire emergency category.

10. The method of claim 1, wherein the one or more sensor identified events comprise one or more alarms.

11. A system comprising:

a panic button associated with a region of the facility;

a video camera for capturing a video stream of at least part of the region of a facility;

one or more sensors associated with the region of the facility for sensing one or more sensor identified events associated with the region of the facility;

an output for issuing alarms;

a controller operatively coupled to the panic button, the video camera, the one or more sensors, and the output, the controller configured to:

implement an Artificial Intelligence and/or Machine Learning (AI/ML engine) that is trained to:

identify one or more video identified events associated with the region of the facility; and identify and classify the current status of the region of the facility into one of the plurality of predetermined status categories based at least in part on the one or more of the video identified events and the one or more sensor identified events the plurality of predetermined status categories including a first plurality of categories that trigger a silent panic alarm when detected and a second plurality of categories that trigger an audible panic alarm when detected;

the AI/ML engine configured to:

perform video analytics on the video stream to identify one or more video identified events associated with the region of the facility;

classify a current status of the region of the facility into one of a plurality of predetermined status categories based at least in part on the one or more video identified events and the one or more sensor identified events;

the controller configured to:

receive a notification of an activation of the panic button; and in response to receiving the notification of the activation of the panic button, issue a panic alarm associated with the region of the facility via the output, wherein the panic alarm is issued as a silent panic alarm when the current status of the region is classified in a first one of the plurality of predetermined status categories and is issued as an audible panic alarm when the current status of the region is classified in a second one of the plurality of predetermined status categories.

12. The system of claim 11, wherein the controller is distributed, with at least part of the controller co-located with the video camera that performs at least part of the video analytics on the video stream to identify one or more video identified events associated with the region of the facility and at least part of the controller implemented on a server in a cloud environment.

13. The system of claim 11, wherein the one or more sensors include intrusion sensors and access control sensors, and the controller is configured to use a fusion of video analytics, intrusion sensor data and access control sensor data in classifying the current status of the region as the first one of the plurality of predetermined status categories or as the second one of the plurality of predetermined status categories.

14. A non-transitory computer readable medium storing instructions that when executed by one or more processors causes the one or more processors to:

receive a video stream capturing at least part of a region of a facility;

perform video analytics on the video stream to identify one or more video identified events associated with the region of the facility;

receive one or more sensor identified events sensed by one or more sensors associated with the region of the facility;

implement an Artificial Intelligence and/or Machine Learning (AI/ML) engine;

provide one or more of the video identified events and one or more sensor identified events to the AI/ML engine, wherein the AI/ML engine is trained to identify and classify the current status of the region of the facility into one of the plurality of predetermined status categories based at least in part on the one or more video identified events and the one or more sensor identified events the plurality of predetermined status categories including a first plurality of categories that trigger a silent panic alarm when detected and a second plurality of categories that trigger an audible panic alarm when detected;

receive a notification of an activation of a panic button; and in response to receiving the notification of the activation of the panic button, issue a panic alarm associated with the region of the facility, wherein the panic alarm is issued as a silent panic alarm when the current status of the region is classified in a first one of the plurality of predetermined status categories and is issued as an audible panic alarm when the current status of the region is classified in a second one of the plurality of predetermined status categories.

15. The non-transitory computer readable medium of claim 14, wherein the silent panic alarm does not activate any sirens associated with the region of the facility and the audible panic alarm does activate one or more sirens associated with the region of the facility.

16. The non-transitory computer readable medium of claim 14, wherein when multiple video identified events and/or sensor identified events are received simultaneously, the one or more processors rely upon relative weights assigned to each of the multiple video identified events and/or sensor identified events to ascertain when the current status of the region is classified in the first one of the plurality of predetermined status categories and when the current status of the region is classified in the second one of the plurality of predetermined status categories.

* * * * *